United States Patent
Recio et al.

(10) Patent No.: US 7,500,051 B2
(45) Date of Patent: Mar. 3, 2009

(54) MIGRATION OF PARTITIONED PERSISTENT DISK CACHE FROM ONE HOST TO ANOTHER

(75) Inventors: Renato J. Recio, Austin, TX (US); Johnny Meng-Han Shieh, Austin, TX (US); Jacobo A. Vargas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/531,328

(22) Filed: Sep. 13, 2006

(65) Prior Publication Data
US 2008/0065826 A1 Mar. 13, 2008

(51) Int. Cl.
G06F 12/00 (2006.01)
G06F 13/00 (2006.01)
G06F 13/28 (2006.01)
G06F 15/177 (2006.01)
G06F 11/00 (2006.01)

(52) U.S. Cl. .................. 711/113; 711/130; 714/100; 709/220; 707/200

(58) Field of Classification Search .................. None
See application file for complete search history.

(56) References Cited
U.S. PATENT DOCUMENTS

| | | | |
|---|---|---|---|
| 5,907,678 A | 5/1999 | Housel, III et al. | |
| 6,453,343 B1 | 9/2002 | Housel, III et al. | |
| 6,868,478 B2 * | 3/2005 | Kishi et al. | 711/113 |
| 2007/0220121 A1 * | 9/2007 | Suwarna | 709/220 |

OTHER PUBLICATIONS

U.S. Appl. No. 11/201,648, filed Aug. 11, 2005, Recio et al.
"Configuring and managing Server Storage", IBM Tivoli Storage Manager for OS/400 PASE: Administrator's Guide, pp. 1-3, retrieved Jul. 13, 2006 http://submit.boulder.ibm.com/tividd/td/UTSM400/GC23-4694-02/en_US/HTML/anrpgd52228.htm.

* cited by examiner

*Primary Examiner*—Reginald G Bragdon
*Assistant Examiner*—Baboucarr Faal
(74) *Attorney, Agent, or Firm*—Duke W. Yee; Matthew B. Baca; Francis Lammes

(57) ABSTRACT

A computer implemented method, data processing system, and computer usable program code are provided for migrating a persistent cache. A priming request is received at an intermediary to prime the persistent cache of a first partition. Data is moved from a disk to the persistent cache and, responsive to the data being moved to the persistent cache, an unmounting command is issued to unmount a first file system in the first partition from the persistent cache. A mounting command is then issued to mount a second file system in a second partition to the persistent cache, wherein the second partition may now use the data contained in the persistent cache.

35 Claims, 4 Drawing Sheets

100 DATA PROCESSING SYSTEM

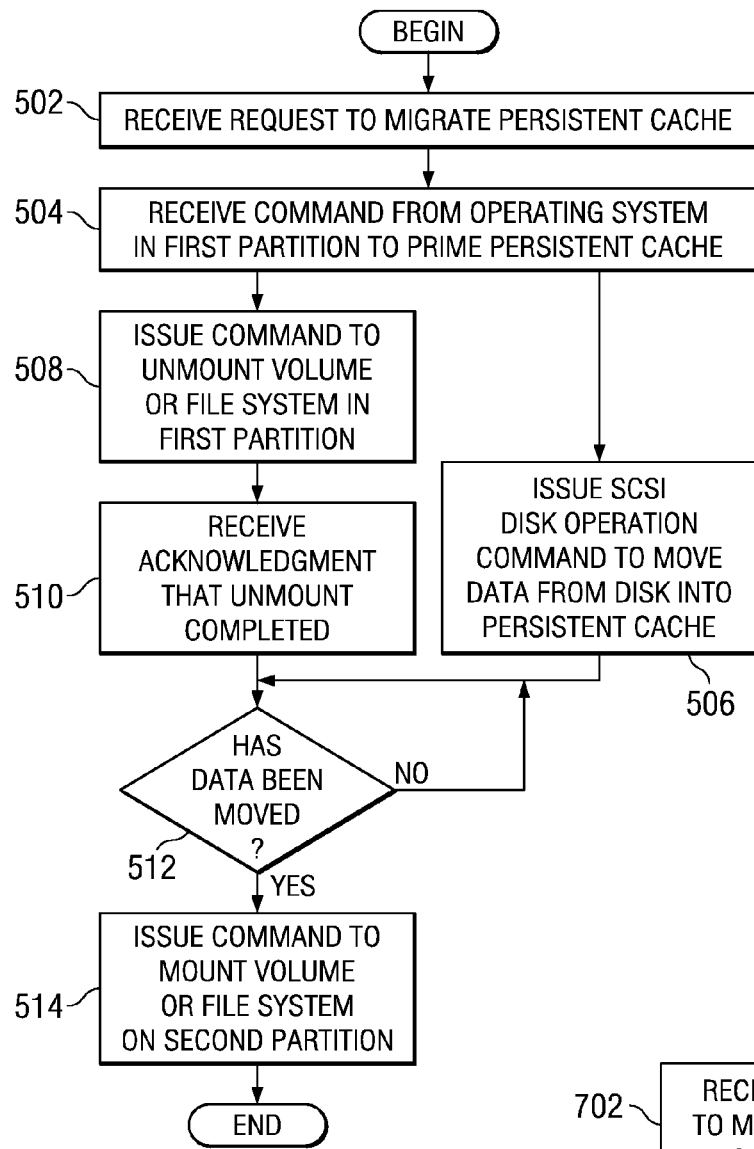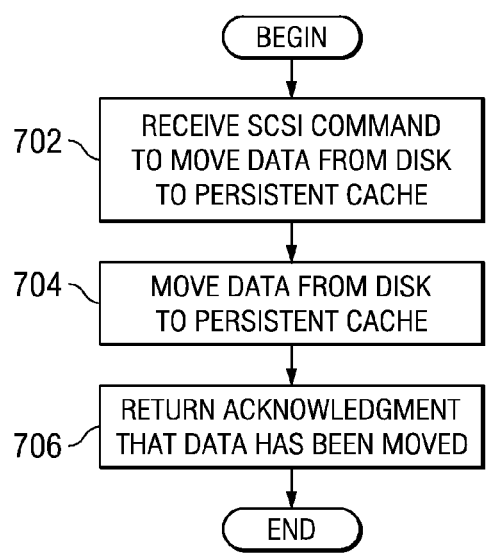

MIGRATION OF PARTITIONED PERSISTENT DISK CACHE FROM ONE HOST TO ANOTHER

BACKGROUND OF THE INVENTION

1. Field of the Invention

The present invention relates generally to an improved data processing system and in particular, to a computer implemented method, data processing system, and computer usable program code for data transfer between hosts on a partitioned system. Still more, the present invention relates to a computer implemented method, data processing system, and computer usable program code for migration of persistent disk cache from one host to another in a partitioned system.

2. Description of the Related Art

Increasingly large symmetric multi-processor data processing systems, such as IBM eServer™ P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include a set of one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform.

With respect to hardware resources in a logical partitioned data processing system, these resources are often disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

Failover is the capability to switch over automatically to a redundant or standby computer server, system, or network upon the failure or abnormal termination of the previously active server, system, or network. Failover usually happens without human intervention and generally without warning, unlike switchover.

Systems designers usually provide failover capability in servers, systems or networks requiring continuous availability and a high degree of reliability. In some cases, computer system failover is not desired to be automatic, but is required to allow human intervention to affect the failover. This is called "automated with manual approval", as the activity is automatic once approval is given. Current failover systems do not provide efficient mechanism to move data from one system to another system.

SUMMARY OF THE INVENTION

The different aspects of the illustrative embodiments provide a computer implemented method, data processing system, and computer usable program code for migrating a persistent cache. The illustrative embodiments receive a priming request at an intermediary to prime the persistent cache of a first partition. The illustrative embodiments move data from a disk to the persistent cache. The illustrative embodiments issue an unmounting command to unmount a first file system in the first partition from the persistent cache in response to the data being moved to the persistent cache. The illustrative embodiments issue a mounting command to mount a second file system in a second partition to the persistent cache, wherein the second partition may now use the data contained in the persistent cache.

In moving data from the disk to the persistent cache, the illustrative embodiments issue, from the intermediary, instructions to a disk to move the data from the disk to the persistent cache, wherein the instructions includes a starting linear block address and an ending linear block address indicating a range of the data that is to be moved into the persistent cache. The illustrative embodiments move the data from the disk into the persistent cache. The illustrative embodiments send an acknowledgement to the intermediary that the data has been moved.

The illustrative embodiments receive, by a first operating system in the first partition, the unmounting command to unmount the first file system in the first partition from the persistent cache. The illustrative embodiments unmount the first file system from the persistent cache. The illustrative embodiments send an acknowledgement from the first operating system to the intermediary that the unmounting has completed. The illustrative embodiments receive the acknowledgement from the first operating system that the unmounting has completed.

The illustrative embodiments receive, by a second operating system in the second partition, the mounting command to mount the second file system in the second partition to the persistent cache. The illustrative embodiments mount the second file system to the persistent cache. The illustrative embodiments issue access commands by the second operating system to access data in the persistent cache. The illustrative embodiments receive a migration request to migrate the persistent cache at a first operating system in the first partition from a script. The illustrative embodiments issue a migration command to an intermediary to prime the persistent cache.

Within the illustrative embodiments, the intermediary may be a Virtual I/O Server and the instructions may be Small Computer System Interface disk operation commands. Also within the illustrative embodiments the first partition and the second partition may be on a same system or on separate systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates a flowchart of the operation performed by a Virtual I/O Server to migrate persistent cache in accordance with an illustrative embodiment;

FIG. 7 illustrates a flowchart of the operation performed by disk in a logically partitioned system to migrate persistent cache in accordance with an illustrative embodiment.

DETAILED DESCRIPTION OF THE PREFERRED EMBODIMENT

Figure 1:
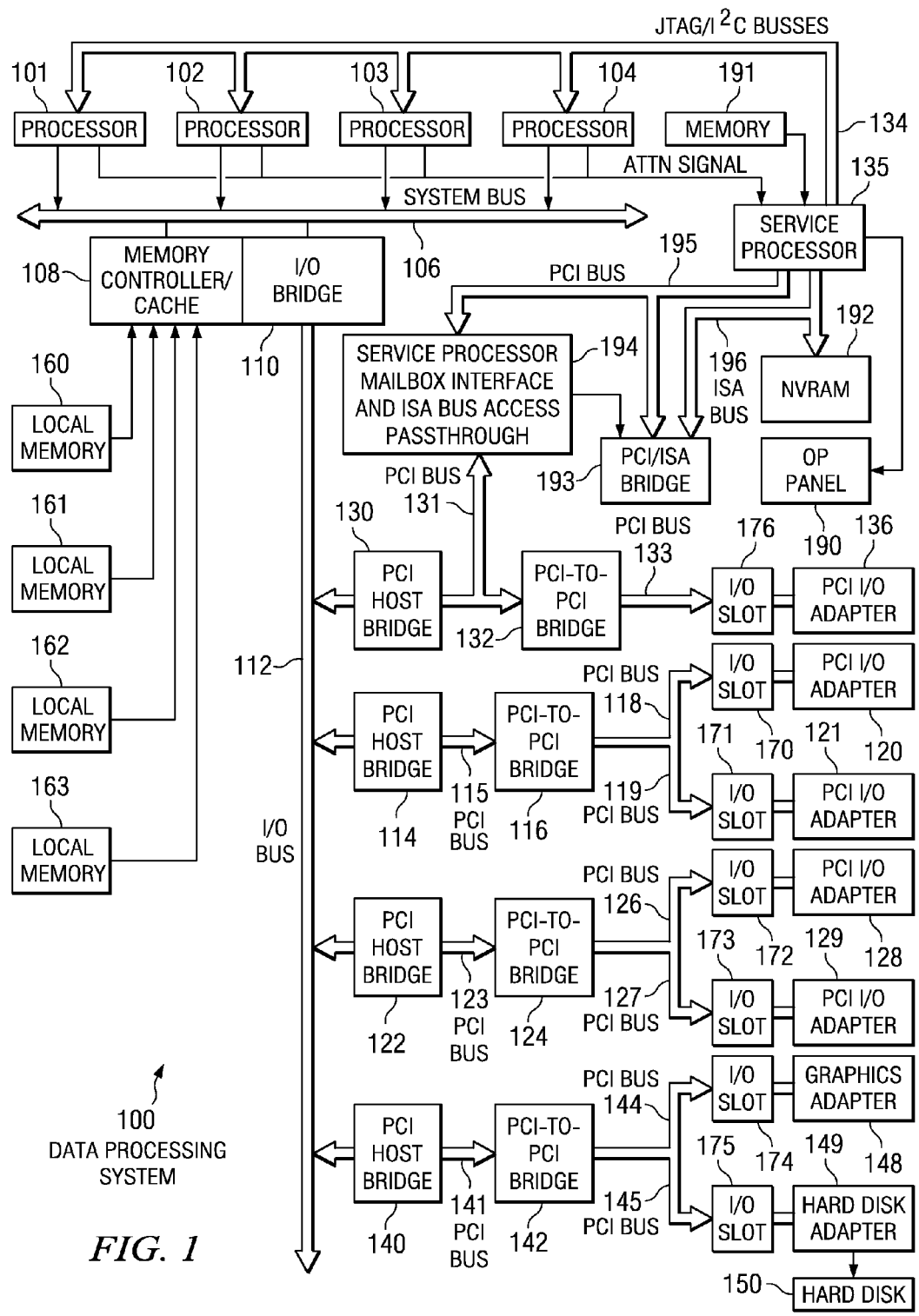
FIG. 1 is a block diagram of a data processing system in which the illustrative embodiments may be implemented.

The illustrative embodiments provide for migrating persistent disk cache from one host to another in a partitioned system. With reference now to the figures, and in particular with reference to FIG. 1, a block diagram of a data processing system in which illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
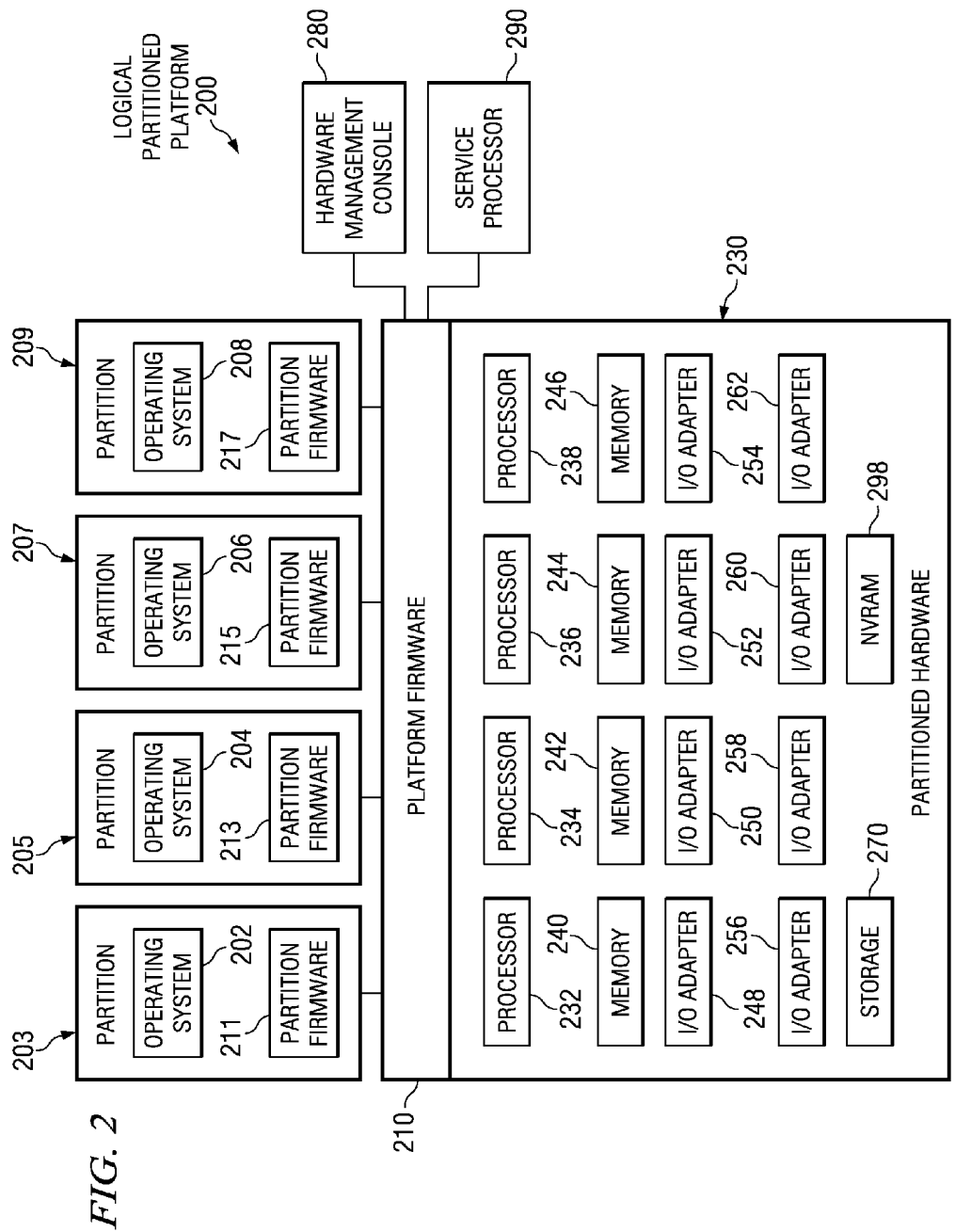
FIG. 2 is a block diagram of an exemplary logical partitioned platform in which the illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The different embodiments recognize that many failover systems do not specify any provisions for allowing persistent cache to be migrated from one host system to another host system so that the data stored in the cache that belongs to the first host system may be owned by the second host system. Thus, the illustrative embodiments provides a computer implemented method, apparatus, and computer usable program code to make the persistent cache on a disk owned by a host system, be exportable to another host system in a partitioned data processing system. Depending on the kind of data cached on the persistent cache, a reason may exist for a system other than the one that owns the "cached" data, to need it. Possible uses may be in system or application failover field or in making cached data available to another system to reduce latency. While technologies, such as Network File System (NFS) and Distributed Computing Environment (DCE), exist that could be used to make one system's data available to another, these networked technologies have an inherited latency that is unacceptable for some applications, such as failover.

Figure 3:
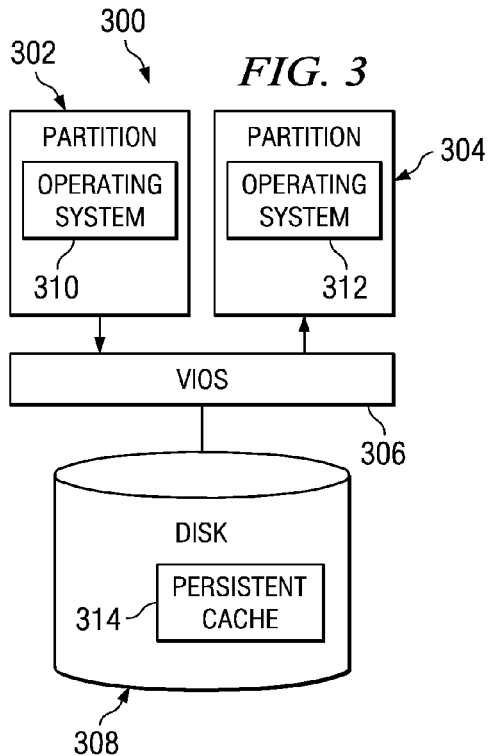
FIG. 3 depicts a functional block diagram of an exemplary partitioned system where persistent cache may be migrated in accordance with an illustrative embodiment.

FIG. 3 depicts a functional block diagram of an exemplary partitioned data processing system where persistent cache may be migrated in accordance with an illustrative embodiment. Data processing system 300 is an example of data processing system, such as logical partitioned platform 200 in FIG. 2. The exemplary function block diagram is comprised of partitions 302 and 304, Virtual I/O Server (VIOS) 306, and disk 308. Partitions 302 and 304 are partitions such as partitions 203 and 205 of FIG. 2. Partitions 302 and 304 may be partitions existing on the same system or partitions existing on two different systems as long as partitions 302 and 304 both use disk 308. Virtual I/O Server 306 is the virtual I/O server platform firmware, such as platform firmware 210 of FIG. 2, component that runs in a logical partition. While this illustrative embodiment uses Virtual I/O Server 306, other types of intermediaries or Virtual Machine Managers (VMMs) may also be used, such as VMware® and Xen™. Virtual I/O Server 306 provides virtual I/O services to partitions 302 and 304.

When an admin or script is received that tells operating system 310, such as operating system 202 in FIG. 2, in partition 302, Virtual I/O Server 306, and operating system 312, such as operating system 204 on FIG. 2, in partition 304 to perform a migration operation. Operating system 310 tells Virtual I/O Server 306 to "prime" persistent cache 314 residing on disk 308. To "prime" persistent cache means to place data in persistent cache 314 on disk 308. The data primed on persistent cache 314 is data that will be needed by operating system 312 at boot time or after boot time.

Virtual I/O Server 306 primes persistent cache 314 with the required data by issuing Small Computer System Interface (SCSI) commands that contain disk cache control hints, such as a Vendor Unique Cache command with list of linear block addresses (LBAs) or a Read command with additional control information, such as a list of linear block addresses. The Small Computer System Interface command indicates that data from a starting linear block address to an ending linear block address is to be moved into persistent cache 314. At the same time that Virtual I/O Server 306 is priming persistent cache 314, operating system 310 may unmount the file system or volume from partition 302. Operating system 310 notifies Virtual I/O Server 306 that the unmounting has completed.

Once the data has been moved from disk 308 to persistent cache 314, Virtual I/O Server 306 indicates to operating system 312 to mount the file system or volume, and, thus, have access to the file system or volume and persistent cache 314. Operating system 312 has access to disk 308 and persistent cache 314 and begins to issue commands, such as read or write commands. A portion of the commands target the data in persistent cache 314, because operating system 310 had previously primed persistent cache 314 with the data that operating system 312 would need at boot time. Instead of obtaining the data from disk 308, data is loaded from persistent cache 314, eliminating the very long mechanical latency, possibly 12-20 milliseconds, associated with reading from disk platters.

Figure 4:
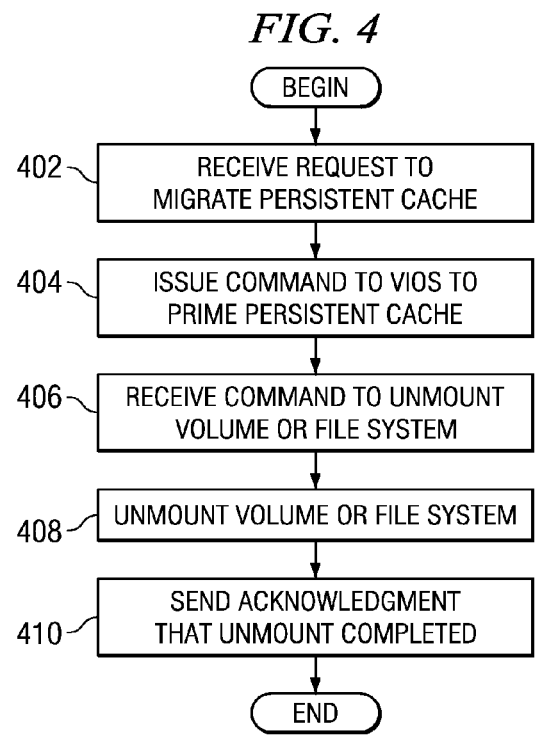
FIG. 4 illustrates a flowchart of the operation performed by an operating system on a first partition to migrate persistent cache in accordance with an illustrative embodiment.

FIG. 4 illustrates a flowchart of the operation performed by an operating system on a first partition to migrate persistent cache in accordance with an illustrative embodiment. As the operation begins, an operating system, such as operating system 310 of FIG. 3, operating on a first partition, receives a request via an admin or a script that indicates persistent cache is to be migrated to a second partition (step 402). The operating system issues a command to a Virtual I/O Server, or equivalent intermediary or manager, to prime the file system's or volume's persistent cache on the disk the operating system uses (step 404). Priming the persistent cache means to place data in the persistent cache in order for the persistent cache to be migrated from one partition to another partition. In response to the command for the persistent cache to be primed, the operating system receives a command from the Virtual I/O Server to unmount the files system or volume (step 406). The file system unmounts the file system or volume (step 408) and sends an acknowledgment that the files system or volume has been unmounted to the Virtual I/O Server (step 410) with the operating terminating thereafter.

FIG. 5 illustrates a flowchart of the operation performed by a Virtual I/O Server to migrate persistent cache in accordance with an illustrative embodiment. As the operation begins, a Virtual I/O Server, such as Virtual I/O Server 306 of FIG. 3, receives a request via an admin or a script that indicates persistent cache is to be migrated from a first partition to a second partition (step 502). The Virtual I/O Server then receives a command from the first partition to prime a file system's or volume's persistent cache (step 504). The Virtual I/O Server primes the persistent cache with the required data by issuing Small Computer System Interface commands that contain disk cache control hints (step 506). The Small Computer System Interface commands indicate that data from a starting linear block address to an ending linear block address is to be moved into the persistent cache.

At the same time Virtual I/O Server is priming the persistent cache, the Virtual I/O Server issues a command to the operating system of the first partition to unmount the file system or volume from the first partition (step 508). The Virtual I/O Server receives an acknowledgement that the operating system on the first partition successfully unmounted the files system or volume (step 510). The Virtual I/O Server then determines if an acknowledgement has been received from the disk that the persistent cache has been moved into persistent cache (step 512). If the move has not been completed, the Virtual I/O Server waits for acknowledgement. Once the data has been moved into persistent cache (step 512), the Virtual I/O Server issues a command to the operating system on the second partition to mount the file system or volume (step 514), with the operation terminating thereafter.

Figure 6:
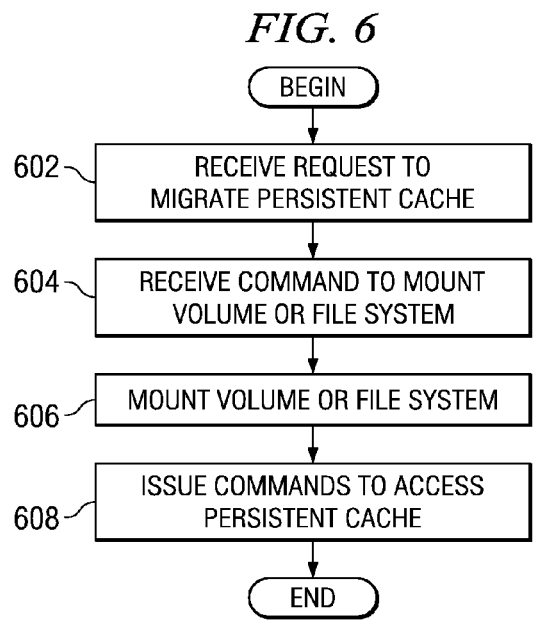
FIG. 6 illustrates a flowchart of the operation performed by an operating system on a second partition to migrate persistent cache in accordance with an illustrative embodiment.

FIG. 6 illustrates a flowchart of the operation performed by an operating system on a second partition to migrate persistent cache in accordance with an illustrative embodiment. As the operation begins, an operating system, such as operating system 312 of FIG. 3, operating on a second partition receives a request via an admin or a script that indicates persistent cache is to be migrated to the second partition (step 602). The operating system waits to receive a command from a Virtual I/O Server to mount a file system or volume (step 604). Once the command is received, the operating system then mounts the file system or volume (step 606), then the operating system has access to the disk and the persistent cache and begins to issue commands, such as read or write commands (step 608), with the operation terminating thereafter. A portion of the commands issued by the operating system targets the data in the persistent cache, because the operating system from the first partition had previously primed the persistent cache with the data that the operating system in the second partition would need at boot time. Instead of obtaining the data from the disk, data is loaded from the persistent cache 314 of FIG. 3, eliminating the very long mechanical latency, possible 12-20 milliseconds, associated with reading from disk platters.

FIG. 7 illustrates a flowchart of the operation performed by disk in a logically partitioned system to migrate persistent cache in accordance with an illustrative embodiment. As the operation begins, the disk, such as disk 308 of FIG. 3, receives Small Computer System Interface commands from a Virtual I/O Server that contain disk cache control hints (step 702). The Small Computer System Interface commands indicate that data from a starting linear block address to an ending linear block address is to be moved into the persistent cache, such as persistent cache 314 of FIG. 3. The disk moves the indicated data from the disk to a persistent cache (step 704). Once the indicated data has been successfully moved, the disk returns an acknowledgement to the Virtual I/O Server (step 706), with the operation terminating thereafter.

Thus, the illustrative embodiments provide a Small Computer System Interface command to prime the persistent cache prior to the migration. Priming the persistent cache provides the operating system with faster access to a portion of the data needed by a target operating system from the persistent cache. Access may be increased from 10 milliseconds using mechanical disk operations to 12-20 milliseconds using the illustrative embodiment. The speed gain when migrating and booting from the cache is proportional to the size of the cache. Advances in non-volatile "Storage Class Memory" will make non-volatile memory 64 times denser than DRAM and provide comparable error rates as magnetic hard disk drive media, such as 1012-1013 error rates. This class of memory can be used to enable large capacity caches.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to migrate a persistent cache, the computer implemented method comprising:
   receiving a priming request at an intermediary to prime the persistent cache of a first partition;
   moving data from a disk to the persistent cache;
   responsive to the data being moved to the persistent cache, issuing an unmounting command to unmount a first file system in the first partition from the persistent cache; and
   issuing a mounting command to mount a second file system in a second partition to the persistent cache, wherein the second partition may now use the data contained in the persistent cache.

2. The computer implemented method of claim 1, wherein moving data from the disk to the persistent cache comprises:
   issuing, from the intermediary, instructions to a disk to move the data from the disk to the persistent cache, wherein the instructions includes a starting linear block address and an ending linear block address indicating a range of the data that is to be moved into the persistent cache;
   moving the data from the disk into the persistent cache; and
   sending an acknowledgement to the intermediary that the data has been moved.

3. The computer implemented method of claim 2, wherein the instructions are Small Computer System Interface disk operation commands.

4. The computer implemented method of claim 1, further comprising:
   receiving, by a first operating system in the first partition, the unmounting command to unmount the first file system in the first partition from the persistent cache; and
   unmounting the first file system from the persistent cache.

5. The computer implemented method of claim 4, further comprising:
sending an acknowledgement from the first operating system to the intermediary that the unmounting has completed.

6. The computer implemented method of claim 5, further comprising:
receiving the acknowledgement from the first operating system that the unmounting has completed.

7. The computer implemented method of claim 1, further comprising:
receiving, by a second operating system in the second partition, the mounting command to mount the second file system in the second partition to the persistent cache; and
mounting the second file system to the persistent cache.

8. The computer implemented method of claim 7, further comprising:
issuing access commands by the second operating system to access data in the persistent cache.

9. The computer implemented method of claim 1, further comprising:
receiving a migration request to migrate the persistent cache at a first operating system in the first partition from a script; and
issuing a migration command to an intermediary to prime the persistent cache.

10. The computer implemented method of claim 1, wherein the intermediary is a Virtual I/O Server.

11. The computer implemented method of claim 1, wherein the first partition and the second partition are on a same system.

12. The computer implemented method of claim 1, wherein the first partition and the second partition are on separate systems.

13. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive a priming request at an intermediary to prime the persistent cache of a first partition; move data from a disk to the persistent cache; issuing an unmounting command to unmount a first file system in the first partition from the persistent cache in response to the data being moved to the persistent cache; and issue a mounting command to mount a second file system in a second partition to the persistent cache, wherein the second partition may now use the data contained in the persistent cache.

14. The data processing system of claim 13, wherein executing the set of instructions to move data from the disk to the persistent cache comprises the processing unit executing the set of instructions to issue, from the intermediary, instructions to a disk to move the data from the disk to the persistent cache, wherein the instructions includes a starting linear block address and an ending linear block address indicating a range of the data that is to be moved into the persistent cache; move the data from the disk into the persistent cache; and send an acknowledgement to the intermediary that the data has been moved.

15. The data processing system of claim 14, wherein the instructions are Small Computer System Interface disk operation commands.

16. The data processing system of claim 13, wherein the processing unit executes the set of instructions to receive, by a first operating system in the first partition, the unmounting command to unmount the first file system in the first partition from the persistent cache; and unmount the first file system from the persistent cache.

17. The data processing system of claim 16, wherein the processing unit executes the set of instructions to send an acknowledgement from the first operating system to the intermediary that the unmounting has completed.

18. The data processing system of claim 17, wherein the processing unit executes the set of instructions to receive the acknowledgement from the first operating system that the unmounting has completed.

19. The data processing system of claim 13, wherein the processing unit executes the set of instructions to receive, by a second operating system in the second partition, the mounting command to mount the second file system in the second partition to the persistent cache; and mount the second file system to the persistent cache.

20. The data processing system of claim 19, wherein the processing unit executes the set of instructions to issue access commands by the second operating system to access data in the persistent cache.

21. The data processing system of claim 13, wherein the processing unit executes the set of instructions to receive a migration request to migrate the persistent cache at a first operating system in the first partition from a script; and issue a migration command to an intermediary to prime the persistent cache.

22. The data processing system of claim 13, wherein the first partition and the second partition are on a same system.

23. The data processing system of claim 13, wherein the first partition and the second partition are on separate systems.

24. A computer program product comprising:
a computer usable storage medium including computer usable program code to migrate a persistent cache, the computer program product including:
computer usable program code for receiving a priming request at an intermediary to prime the persistent cache of a first partition;
computer usable program code for moving data from a disk to the persistent cache;
computer usable program code for issuing an unmounting command to unmount a first file system in the first partition from the persistent cache in response to the data being moved to the persistent cache; and
computer usable program code for issuing a mounting command to mount a second file system in a second partition to the persistent cache, wherein the second partition may now use the data contained in the persistent cache.

25. The computer program product of claim 24, wherein the computer usable program code for moving data from the disk to the persistent cache includes:
computer usable program code for issuing, from the intermediary, instructions to a disk to move the data from the disk to the persistent cache, wherein the instructions includes a starting linear block address and an ending linear block address indicating a range of the data that is to be moved into the persistent cache;
computer usable program code for moving the data from the disk into the persistent cache; and
computer usable program code for sending an acknowledgement to the intermediary that the data has been moved.

26. The computer program product of claim 25, wherein the instructions are Small Computer System Interface disk operation commands.

27. The computer program product of claim 24, further including:
   computer usable program code for receiving, by a first operating system in the first partition, the unmounting command to unmount the first file system in the first partition from the persistent cache; and
   computer usable program code for unmounting the first file system from the persistent cache.

28. The computer program product of claim 27, further including:
   computer usable program code for sending an acknowledgement from the first operating system to the intermediary that the unmounting has completed.

29. The computer program product of claim 28, further including:
   computer usable program code for receiving the acknowledgement from the first operating system that the unmounting has completed.

30. The computer program product of claim 24, further including:
   computer usable program code for receiving, by a second operating system in the second partition, the mounting command to mount the second file system in the second partition to the persistent cache; and
   computer usable program code for mounting the second file system to the persistent cache.

31. The computer program product of claim 30, further including:
   computer usable program code for issuing access commands by the second operating system to access data in the persistent cache.

32. The computer program product of claim 24, further including:
   computer usable program code for receiving a migration request to migrate the persistent cache at a first operating system in the first partition from a script; and
   computer usable program code for issuing a migration command to an intermediary to prime the persistent cache.

33. The computer program product of claim 24, wherein the intermediary is a Virtual I/O Server.

34. The computer program product of claim 24, wherein the first partition and the second partition are on a same system.

35. The computer program product of claim 24, wherein the first partition and the second partition are on separate systems.

* * * * *